United States Patent [19]

Tamura et al.

[11] Patent Number: 4,549,073
[45] Date of Patent: Oct. 22, 1985

[54] CURRENT CONTROLLER FOR RESISTIVE HEATING ELEMENT

[75] Inventors: Paul S. Tamura, Palo Alto; Robert J. Strehlow, Mountain View, both of Calif.

[73] Assignee: Oximetrix, Inc., Mountain View, Calif.

[21] Appl. No.: 319,101

[22] Filed: Nov. 6, 1981

[51] Int. Cl.$^4$ .............................................. H05B 1/02
[52] U.S. Cl. ................................... 219/497; 219/505; 219/492; 323/364
[58] Field of Search .............. 219/497, 499, 501, 505, 219/494, 492, 10.55 B; 307/117, 252 UA, 252 B; 323/364

[56] References Cited

U.S. PATENT DOCUMENTS

| | | | |
|---|---|---|---|
| 3,789,190 | 1/1974 | O'rosy et al. | 219/497 |
| 3,959,692 | 5/1976 | Wetzel | 219/499 |
| 4,002,882 | 1/1977 | McCutchen | 219/499 |
| 4,083,054 | 4/1978 | Moraw et al. | 219/505 |
| 4,267,434 | 5/1981 | Simpson | 219/497 |
| 4,311,895 | 1/1982 | Tanabe | 219/497 |
| 4,363,957 | 12/1982 | Tachikawa et al. | 219/497 |

Primary Examiner—M. H. Paschall
Attorney, Agent, or Firm—Lyon & Lyon

[57] ABSTRACT

A controller for regulating current flow through a resistive heating element in order to adjust the temperature thereof is disclosed. The controller includes a means for periodically measuring the resistance of the heating element. During controller calibration, the rate of change of the measured heating element resistance is ascertained in order to determine whether the heating element is at ambient temperature. Computations are performed on the value of the measured heating element resistance associated with ambient temperature conditions, enabling the controller to predict the value of the heating element resistance at a desired temperature. Current is then conducted through the heating element to generate heat, while periodic measurements of the heating element resistance are performed. The resistance values obtained during these latter resistance measurements are compared with the predicted resistance of the heating element associated with the desired temperature and the difference between the predicted resistance and each measured resistance is used to generate a control signal which regulates the flow of heating current through the heating element until desired temperature is reached.

15 Claims, 10 Drawing Figures

FIG. 6A

CURRENT CONTROLLER FOR RESISTIVE HEATING ELEMENT

TECHNICAL FIELD

The present invention is directed to a controller which heats a resistive heating element to a desired temperature and more particularly to a controller which regulates the flow of current through the resistive heating element in accordance with the comparison between the measured resistance of the resistive heating element and the predicted resistance of the heating element at the desired temperature.

BACKGROUND ART

Resistive heating elements provide a simple and economically practical means for generating heat in a wide variety of situations. For example, devices as diverse as those employed in the home appliance field, the industrial equipment field and the medical/surgical instrument field all utilize resistive heating elements to achieve or maintain desired temperatures under varying conditions. In some applications, such as home heating systems, relatively gross temperature control over the resistive heating element is sufficient to satisfy temperature demands. Other applications, such as those involving the use of hemostatic scalpel blades during surgical operations, require precise control over resistive heating element temperatures if the resistive heating element is to be successfully operated. It is with this latter category of applications that the controller of the present invention is concerned.

DISCLOSURE OF THE INVENTION

It is therefore an object of the present invention to provide a controller for a resistive heating element.

It is another object of the present invention to provide a controller for a resistive heating element wherein the amount of current flowing through the resistive heating element is precisely regulated to govern the temperature of the resistive heating element.

It is yet another object of the present invention to provide a controller for heating a resistive heating element to a desired temperature wherein the controller predicts the resistance of the heating element at the desired temperature.

It is a further object of the present invention to provide a controller for heating a resistive heating element to a desired temperature wherein a sensing current is coupled across the resistive heating element and used to determine the heating element resistance at ambient or room temperature, the predicted resistance of the heating element at the desired temperature thereafter being determined by multiplying the ambient resistance with a parameter which varies as a function of the desired temperature.

It is still a further object of the present invention to provide a controller for heating a resistance element to a desired temperature wherein the controller measures the actual resistance of the resistive heating element and compares the actual resistance so measured with a predicted value of the heating element resistance at the desired temperature in order to derive a control signal having a value which varies as a function of the difference between the measured resistance and the predicted resistance, the control signal thereafter being used to regulate the flow of current through the resistive heating element.

These and other objects of the present invention are achieved by a controller which measures the ambient resistance $R_{amb}$ of the heating element at ambient temperature and uses the measured value of the ambient resistance to compute the predicted resistance $R_{hot}$ of the heating element at the desired temperature. After the predicted resistance $R_{hot}$ has been computed, heating current is passed through the resistive heating element to generate heat while the actual resistance of the heating element is periodically measured. The actual resistance measurements $R_m$ are compared with the value of the predicted resistance $R_{hot}$ and the difference between the two serves to generate a control signal for regulating the flow of heating current. When $R_m$ and $R_{hot}$ equal one another, the heating element is assumed to have reached the desired temperature. Heating current is then shunted past the resistive heating element until cooling of the heating element or an increase in the desired temperature setting once again causes the value of the measured resistance to differ from the value of the predicted resistance.

BRIEF DESCRIPTION OF THE DRAWINGS

The various features, objects and advantages of the present invention will become more apparent from the following Brief Description of the Drawings and Best Mode for Carrying Out the Invention, wherein:

FIGS. 4A–4M graphically represent various timing and address pulses generated by the logic board of FIG. 3.

BEST MODE FOR CARRYING OUT THE INVENTION

The simple electrical relationship which exists between the resistance of a resistive heating element and the amount of heat given off by the element in response to current flow therethrough makes resistive heating elements particularly attractive from a control standpoint. Basically, the amount of heat given off by any electrical conductor in response to current flow is a function of the resistance of the conductor. Resistance in turn varies as the temperature T of the conductor changes. This relationship between resistance and temperature can be expressed as follows:

$$R(T) = R_{amb} X(1 + \propto \Delta T), \qquad (1)$$

where $R_{amb}$ is the resistance of the conductor at ambient temperature $T_{amb}$, $\propto$ is a temperature coefficient having a value dependent upon both the ambient temperature and the composition of the conductor and $\Delta T = T - T_{amb}$. Using Equation (1), the value of the resistance $R_{hot}$ presented to the flow of current through a given conductor can be predicted for any desired conductor temperature $T_{hot}$. Precise temperature control over the heat generated in the conductor then becomes a simple matter of regulating current flow until the measured value of the conductor resistance $R_m$ equals the predicted value of the conductor resistance $R_{hot}$ at the desired temperature, i.e., until $$R_m = R_{hot} \qquad (2)$$

Figure 1:
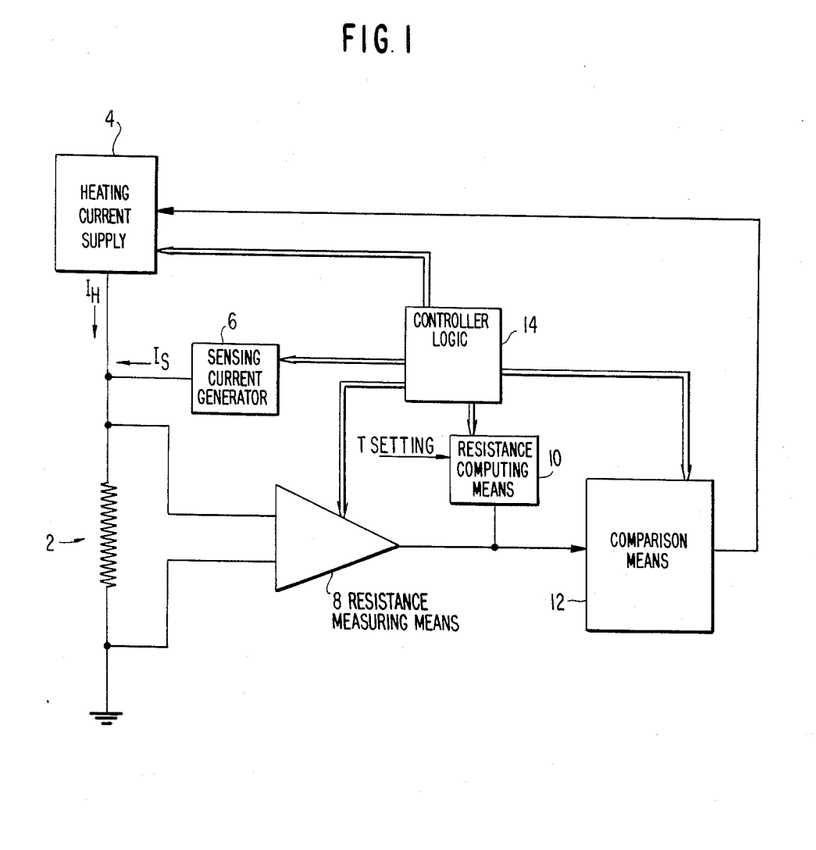
FIG. 1 is a schematic illustration depicting the fundamental operations of a current controller constructed in accordance with the present invention.

A controller which regulates current flow through an electrical conductor such as a resistive heating element for the purpose of generating a desired amount of heat is schematically illustrated in FIG. 1. Resistive heating element 2 is alternately connected to receive heating current $I_H$ from a heating current supply 4 and sensing current $I_s$ from a sensing current generator 6. A resistance measuring means 8 is connected across resistive heating element 2 to provide on-going measurements of the heating element resistance while a resistance computing means 10 computes the predicted resistance $R_{hot}$ of the resistive heating element at the desired temperature T. The values of $R_m$ and $R_{hot}$ are compared in a comparison means 12 and used to generate a control signal for adjusting the flow of heating current $I_H$ from heating current supply 4. The operation of heating current supply 4, sensing current generator 6, resistance measuring means 8, resistance computing means 10 and comparison means 12 is coordinated by timing pulses supplied from controller logic 15.

A preferred operating sequence for the controller of FIG. 1 will now be described. When controller operation is initiated, sensing current generator 6 directs a flow of sensing current $I_s$ through resistive heating element 2 while heating current supply 4 is deactivated. Sensing current $I_s$ produces a voltage drop across the resistive heating element, which voltage drop furnishes a measure of the resistance $R_m$ of the heating element. If the change in measured resistance $R_m$ over time is sufficiently small, resistive heating element 2 is assumed to be at ambient temperature, and the value of the measured resistance thus represents the ambient resistance $R_{amb}$ of the heating element. This value is stored in resistance computing means 10 along with a desired temperature setting enabling the resistance computing means to compute the predicted resistance $R_{hot}$ of the resistive heating element at the desired temperature in accordance with Equation (1).

The desired temperature setting may be entered into the resistance computing means in the form of a temperature index TI, where TI is related to the desired temperature T by the equation:

$$T = 2TI + 100 \qquad (3)$$

After the value of $R_{amb}$ has been measured and stored, heating current $I_H$ from heating current supply 4 is intermittently passed through resistive heating element 2 to generate heat as a function of power dissipation in the heating element. During the intervals between intermittent heating current flow, the sensing current $I_s$ from sensing current generator 6 is supplied to the resistive heating element and resistance measuring means 8 continues to measure the actual heating element resistance $R_m$. The value of $R_m$ and the value of the predicted resistance $R_{hot}$ from the resistance computing means 10 are compared with one another in comparison means 12, with the difference between the two values serving as an indication of the extent to which flow of heating current $I_H$ from heating current supply 4 ought to be adjusted. That is, where $R_m$ and $R_{hot}$ differ, resistive heating element 2 is not yet at the desired temperature and intermittent flow of heating current $I_H$ from heating current source 4 is maintained. On the other hand, if the value of the measured resistance and the value of the predicted resistance at the desired temperature are equal, an assumption is made that resistive heating element 2 has reached the desired temperature and comparison means 12 generates a control signal to interrupt the intermittent flow of current from heating current source 4. This interruption in heating current flow will continue until the resistive heating element 2 cools to a point sufficient to lower the value of the measured resistance $R_m$ or until the desired temperature setting (and hence the value of the predicted resistance $R_{hot}$) is increased, whereupon the difference between $R_m$ and $R_{hot}$ again causes comparison means 6 to signal the need for additional heating current flow through the resistive heating element.

It is to be understood that the controller scheme of FIG. 1 may be implemented in either software or hardware form. One suitable configuration for a hardware-implemented controller constructed in accordance with the present invention is illustrated in FIGS. 2 through 5. The FIG. 2-5 controller operates in cycles such that each cycle coincides with any one of several operating states depending upon whether the controller is in a calibrating mode or a heating mode. More particularly, as soon as power to the controller is switched on, the calibrating mode is initiated and the controller enters a first state wherein certain limit checks, discussed in greater detail hereinbelow, are performed on the resistive heating element 2 to ensure that the controller and the resistive heating element are properly connected and that the resistive heating element is not defective. Once the initial limit checks are completed, the controller cycles through a series of calibration states $ST_1$ through $ST_5$ during which states the ambient resistance $R_{amb}$ of the resistive heating element 2 is measured and stored. Following successful completion of the calibrating states, the controller advances to an $ST_6$ or heating state to initiate the heating mode, and current is thereafter cyclically supplied to the resistive heating element for the purpose of generating heat in accordance with periodic comparisons between the measured resistance $R_m$ of the resistive heating element and the computed resistance $R_{hot}$ at the desired heating element temperature.

Figure 2:
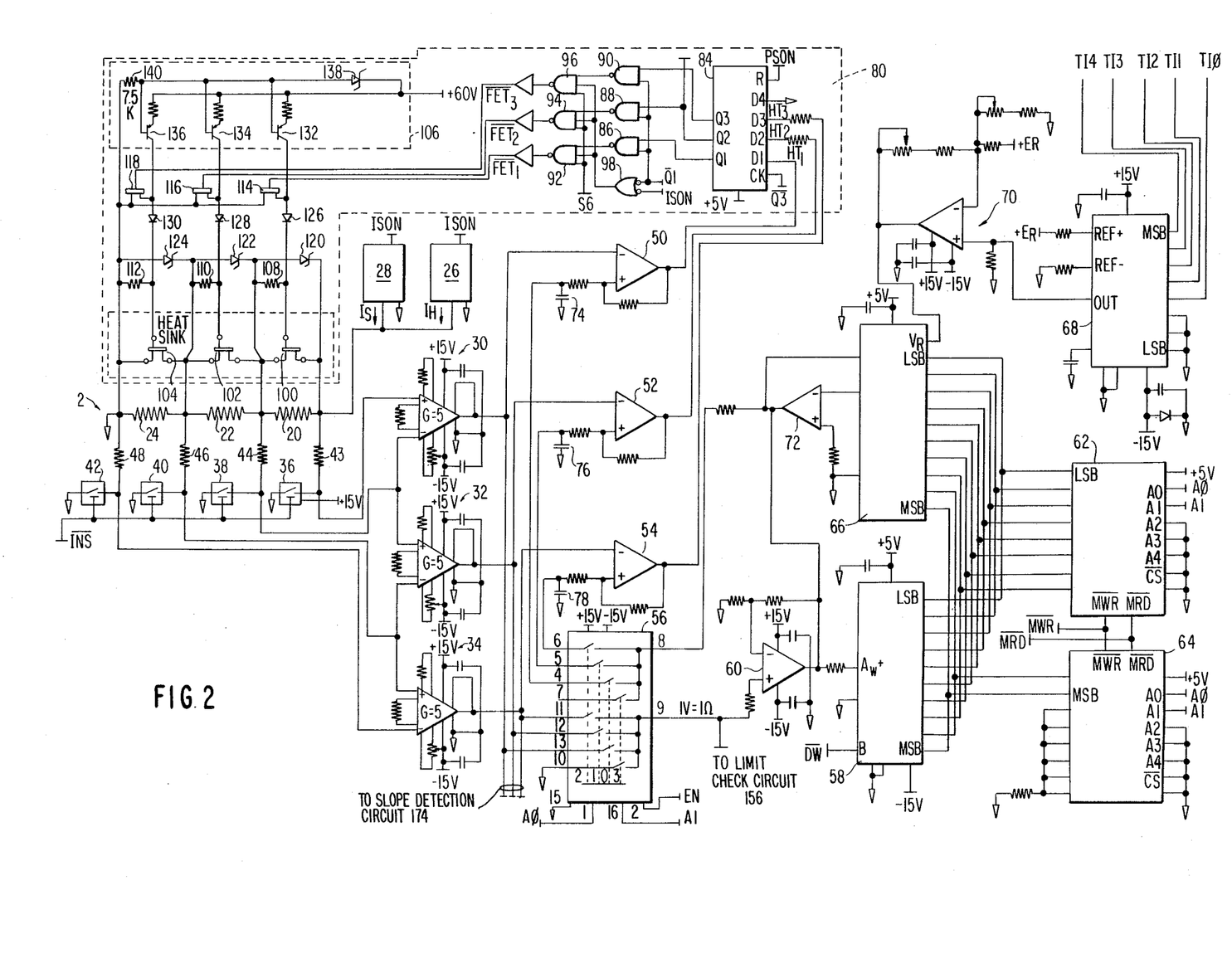
FIG. 2 is a circuit diagram of the analog resistance measuring and heating current control circuitry employed in conjunction with a hardware version of the controller of FIG. 1.

Turning now to FIG. 2, the resistance measuring and current supply circuitry of the controller can be seen. Resistive heating element 2 may, if desired, comprise a set of three resistive heating segments 20, 22 and 24 connected in series to receive either heating current $I_H$ from heating current supply 26 or sensing current $I_s$ from sensing current generator 28. Appropriate circuit modifications, of course, will render the controller of the present invention useable with resistive heating elements having greater or lesser numbers of resistive heating segments. A series of instrumentation amplifiers 30, 32 and 34 are respectively connected across resistive heating segments 20, 22 and 24 to provide a measure of the resistance of each resistive heating segment. When heating current $I_H$ is flowing through resistive heating segments 20-24, the instrumentation amplifier inputs are grounded through digital switches 36, 38, 40 and 42. When sensing current $I_s$ is supplied to the resistive heating segments 20-24 by sensing current generator 28, however, the digital switches 36-42 are opened in response to a switch open signal $\overline{INS}$ from the controller logic (not shown in FIG. 2). The respective voltages generated as the sensing current flows through the resistive heating segments 20-24 then appear at the instrumentation amplifier inputs. The gain of each instrumentation amplifier 30-34 is adjusted such that the value of the instrumentation amplifier output equals the value of the resistance of the corresponding resistive heating segment. For example, where a sensing current of 0.2 amps is utilized to obtain resistance measurements, the gain of each instrumentation amplifier is set to five, resulting in an amplifier output of one volt per ohm of measured resistance. Upon completion of each resistance measuring sequence or interval, digital switches 36 ∝ 42 are again closed in response to the $\overline{INS}$ signal from the controller logic and the instrumentation amplifier inputs are shorted to ground. The presence of resistors 43, 44, 46 and 48 serve to limit the flow of current through each digital switch.

The output from each instrumentation amplifier 30, 32 and 34, representing the measured resistance $R_m$ of each resistive heating segment 20, 22 and 24, is supplied to a corresponding comparator 50, 52 and 54 for comparison with the predicted value of the resistive heating segment resistance $R_{hot}$ at the desired resistive heating segment temperature. The instrumentation amplifier outputs are also multiplexed through multiplexer 56 and supplied to an A-to-D converter 58. An amplifier 60 connected between multiplexer 56 and A-to-D converter 58 furnishes the necessary scaling. Multiplexer 56 is controlled by address bits $A_0$ and $A_1$ supplied from the controller logic, which address bits shift at the outset of each controller operating cycle to assume one of four binary states 00, 01, 10, and 11. Each resistive heating segment 20-24 is associated with a unique address, say address 00 for resistive heating segment 20, address 01 for resistive heating segment 22, and address 10 for resistive heating segment 24. It can also be seen that one of the addresses, e.g., 11 in the present example, is a fictitious address when used in connection with the 3-segment heating element of the FIG. 2 embodiment. During the calibration mode of controller operation, each of the instrumentation amplifier outputs multiplexed to A-to-D converter 58 is monitored, as described in further detail below, to ensure that the corresponding resistive heating segment is at room or ambient temperature. If ambient temperatures exist, the instrumentation amplifier output, which now represents the ambient resistance $R_{amb}$ of the corresponding resistive heating segment, is digitized by A-to-D converter 58 in response to a data write pulse $\overline{DW}$ from the controller logic. The digitized value of $R_{amb}$ is then written into random access memories 62, 64 in response to a memory write $\overline{MWR}$ pulse supplied from the controller logic. It can be seen upon examination of FIG. 2 that both of the random access memories 62 and 64 are addressed by the same address bits $A_0$, $A_1$ controlling multiplexer 56. Hence, a one-to-one relationship between the measured value of the ambient resistance for each resistive heating segment and the storage location of the measured value is preserved.

When the controller is operating in the heating mode, the values of $R_{amb}$ for each resistive heating segment 20, 22 and 24 are sequentially recalled from random access memories 62 and 64 in response to successive memory read pulses $\overline{MRD}$ supplied from the controller logic. The sequentially recalled values of $R_{amb}$ are received by a D-to-A multiplying converter 66 having a reference voltage set to represent the value of a predetermined constant multiplied by the value of the temperature factor $(1+\alpha\Delta T)$. The magnitude of the predetermined constant is chosen to offset the scaling factor associated with amplifier 60 at the input to A-to-D converter 58. The temperature factor $(1+\alpha\Delta T)$ is derived by providing a D-to-A converter 68 with a digital representation $TI_0-TI_4$ of the Temperature Index defined by Equation (3) and thereafter adjusting gain and offset in the converter output amplifier stage 70 to produce a voltage representative of the temperature factor. The output of D-to-A converter 66 accordingly represents the value of a given ambient resistance $R_{amb}$ multiplied by the temperature factor, which value in turn represents the predicted resistance $R_{hot}$ for a given resistive heating segment at the desired temperature. The D-to-A output is converted to a voltage by amplifier 72 and multiplexed through multiplexer 56 to one of the comparators 50, 52 or 54 in accordance with the address $A_0$, $A_1$ entered into multiplexer 56. The outputs of comparators 50, 52 and 54, respectively designated $HT_1$, $HT_2$ and $HT_3$, provide a ready indication of the difference between the predicted resistance $R_{hot}$ and the measured resistance $R_m$ for each resistive heating segment 20, 22, and 24, and may thus serve as control signals for increasing or decreasing the amount of heating current required by each resistive heating segment in order to reach or maintain the desired heating segment temperature.

It should here be noted that the use of address $A_0$, $A_1$ for both multiplexer control and random access memory control ensures that the value of a predicted resistance based on the ambient resistance of a given resistive heating segment will be supplied only to that comparator associated with the given resistive heating segment. It should also be noted that simultaneous comparisons between the measured resistance $R_m$ and the predicted resistance $R_{hot}$ for each resistive heating segment 20, 22 and 24 occur during each operating cycle of the controller heating mode, even though the value of the predicted resistance for a given resistive heating segment is supplied to the comparator associated with that resistive heating segment only once for every four operating cycles. During the remaining three operating cycles, capacitors 74, 76 and 78 respectively connected to the predicted resistance inputs of comparators 50, 52 and 54 operate to store the values of the predicted resistances, enabling simultaneous comparisons between the predicted resistances and the measured resistances for each operating cycle.

The regulation of heating current flow $I_H$ through resistive heating segments 20, 22 and 24 is accomplished via control circuit 80. Control circuit 80 includes a D flip-flop 84 having data inputs connected to receive the control signals $HT_1$, $HT_2$, and $HT_3$ from comparators 50, 52 and 54. The Q outputs of flip-flop 84 are respectively connected through a series of NAND gates 86, 88 and 90 to supply single inputs to a series of triple-input NAND gates 92, 94 and 96. The remaining inputs to NAND gates 86-90 are connected to receive timing pulses $\overline{Q_1}$ from the controller logic. As will be seen in connection with FIGS. 3 and 4, $\overline{Q_1}$ is high for all but a short interval at the outset of each controller operating cycle. The remaining inputs to triple-input NAND gates 92-96 are supplied by the output of NAND gate 98 and an $S_6$ signal from the controller logic. NAND gates 92, 94 and 96 respectively output signals designated $\overline{FET_1}$, $\overline{FET_2}$ and $\overline{FET_3}$, which signals act to shunt heating current $I_H$ from the resistive heating segments in a manner to be described. Finally, NAND gate 98 is connected to receive the aforementioned $\overline{Q_1}$ timing pulse as well as an ISON timing pulse from the controller logic.

Flip-flop 84 is clocked once during each operating cycle by timing pulse $\overline{Q_3}$ from the controller logic. As long as the $HT_1$, $HT_2$ and $HT_3$ outputs from comparators 50, 52 and 54 indicate no demand for heat from the resistive heating segments 20, 22 or 24 associated therewith, the Q outputs from flip-flop 84 remain low to drive the outputs of NAND gates 86, 88 and 90 high. If the resistance measuring interval of the operating cycle has been completed, the controller logic generates a low ISON signal and the output of NAND gate 98 switches high. Assuming that the controller is in its heating mode, the $S_6$ signal from the controller logic will also be high and the triple-input NAND gates 92, 94 and 96 will output low signals. If, on the other hand, the $HT_1$, $HT_2$ or $HT_3$ output from a given comparator 50, 52 or 54 indicates a demand for heating current in the associated resistive heating segment, the corresponding Q output from flip-flop 84 will clock high to drive the output of the associated NAND gate 86, 88 or 90 low, whereupon the $\overline{FET_1}$, $\overline{FET_2}$ or $\overline{FET_3}$ output of the associated triple-input NAND gate 92, 94 or 96 will switch high.

Control circuit 80 also includes a series of power transistors 100, 102 and 104 respectively connected in shunt configuration across resistive heating segments 20, 22 and 24. Each power transistor is activated by biasing the gate thereof positive with respect to the source thereof. Such biasing is in turn accomplished by conducting a suitable current from a constant current source 106 through a resistor 108, 110 or 112 connected between the transistor source and gate. A series of transistors 114, 116 and 118 are connected between constant current source 106 and resistors 108, 110 and 112. The gates of each transistor 114, 116 and 118 are respectively connected to receive the control signals $\overline{FET_1}$, $\overline{FET_2}$ and $\overline{FET_3}$ from NAND gates 92, 94 and 96. When any of the $HT_1$, $HT_2$ and $HT_3$ outputs from comparators 50, 52 and 54 is low, indicating no demand for heating current in a particular resistive heating segment, the resulting low $\overline{FET_1}$, $\overline{FET_2}$ or $\overline{FET_3}$ signal will turn off the appropriate transistor 114, 116 or 118. Current from constant current source 106 thus continues to flow through the corresponding resistor 108, 110 or 112, activating the associated power transistor 100, 102 or 104 and shunting current around the particular resistive heating segment. If, however, the comparator associated with a given resistive heating segment has signaled a demand for heating current, the associated control signal $\overline{FET_1}$, $\overline{FET_2}$ or $\overline{FET_3}$ will switch high to turn on the appropriate transistor 114, 116 or 118 to draw off current from constant current source 106. Current flow through the associated resistor 108, 110 or 112 is thereafter stopped, deactivating the associated power transistor 100, 102 or 104. With the associated power transistor in an off condition, heating current flows through the given resistive heating segment to generate heat. Diodes 120, 122 and 124 provide transient protection for the power transistors 100, 102 and 104, while diodes 126, 128 and 130 prevent current from flowing back into constant current source 106 when transistors 114, 116 and 118 are on. If desired, constant current source 106 may be constructed using a series of transistors 132, 134 and 136 supplied by 60 volts unregulated power. A zener diode 138 biased by resistor 140 provides the desired reference for gating transistors 132-136.

When control circuit 80 is examined closely, several constraints on the controller operation are apparent. First, no heating current can flow through resistive heating segments 20, 22 and 24 during the calibrating mode of the controller. This is because the $S_6$ signal from the controller logic is low for all controller operating cycles which occur during the calibrating mode. NAND gates 92-96 in power transistor control circuitry 80 are accordingly disabled to produce high $\overline{FET_1}$, $\overline{FET_2}$ and $\overline{FET_3}$ control signals and power transistors 100, 102 and 104 remain in an off condition to permit flow of sensing current $I_s$ through the resistive heating segments. When the controller is in a heating mode, the ISON signal supplied by controller logic to NAND gate 98 is driven high to signal the beginning of a resistance measuring interval in the operating cycle. Unless the $\overline{Q_1}$ timing pulse also input to NAND gate 98 is low, which only occurs for a brief interval at the outset of each operating cycle, the output of NAND gate 98 will switch low to drive the outputs from NAND gates 92-96 high, again turning power transistors 100-104 off to permit the flow of sensing current through the resistive heating segments. Of course, during the brief interval at the outset of each operating cycle defined by a low $\overline{Q_1}$ control pulse, the output from NAND gates 86-92 will all switch high to drive triple-input NAND gates 92-96 low, turning power transistors 100-104 on. This latter procedure serves to dissipate any energy inductively stored in the resistive heating segments prior to performing the resistance measurement. Finally, during the period between the end of the resistance measuring interval and the end of each operating cycle of the controller heating mode, power transistors 100-104 will be deactivated as previously described whenever the resistive heating segments associated therewith require heating.

Figure 3:
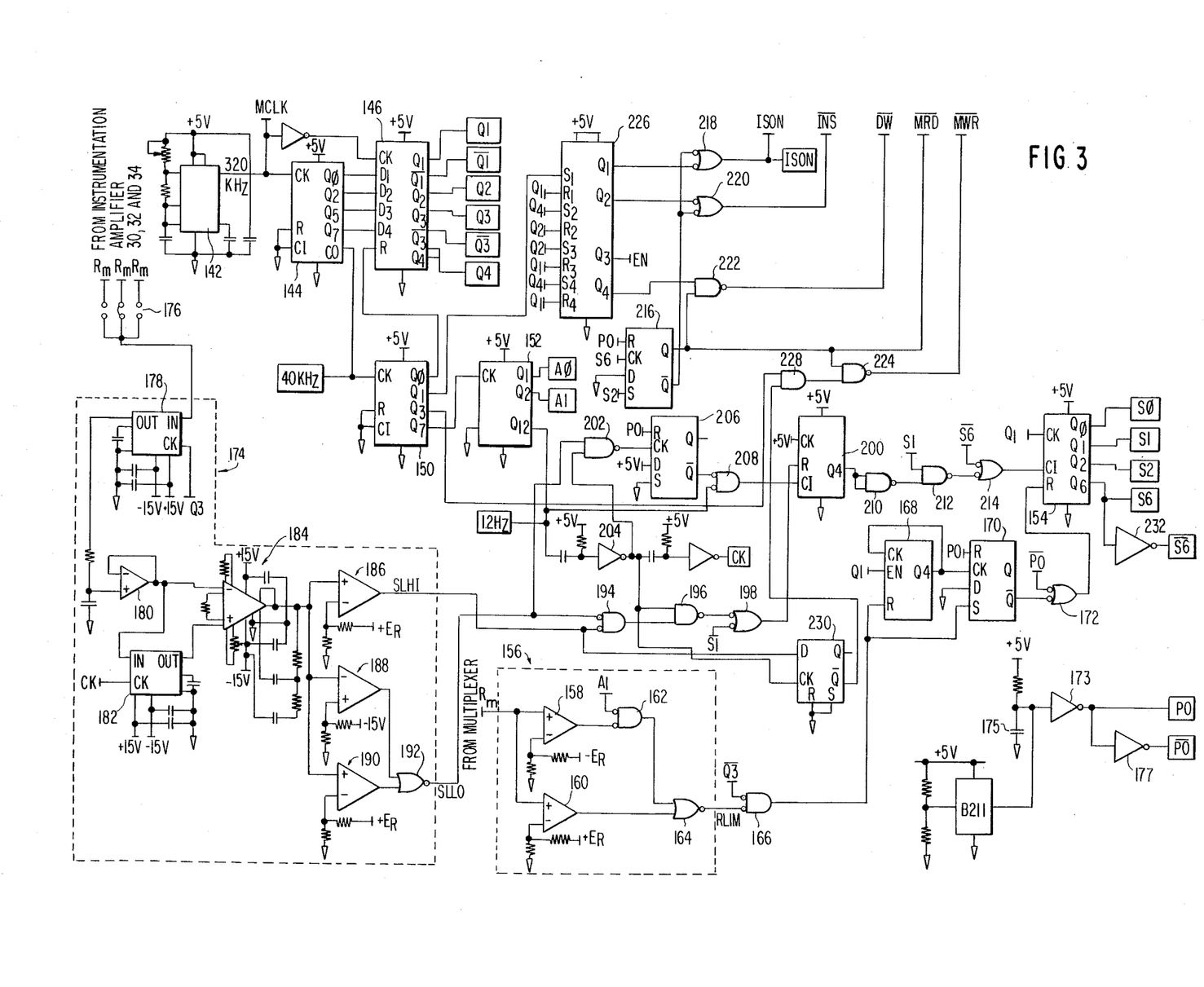
FIG. 3 is a circuit diagram of a logic board for use in governing the operation of the circuitry disclosed in FIG. 2.
Figure 4A:
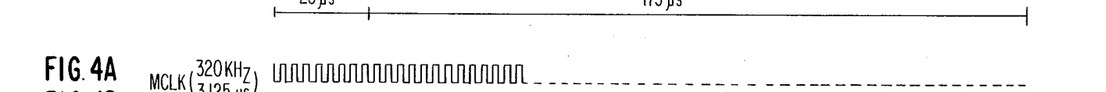
Figure 4B:
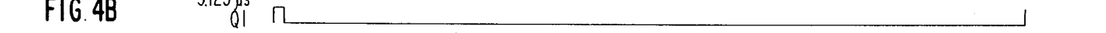
Figure 4C:
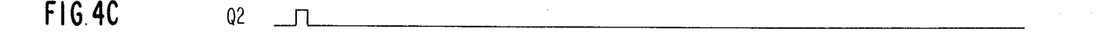
Figure 4D:
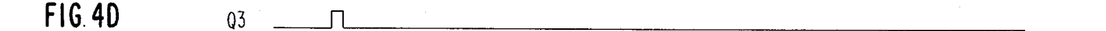
Figure 4E:
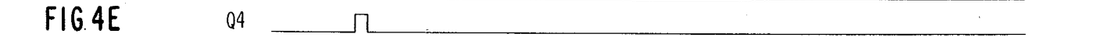
Figure 4F:
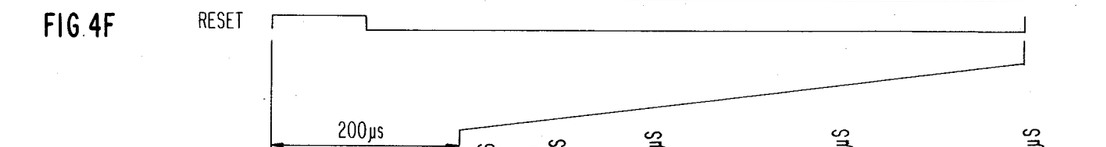

The controller logic of the present invention is illustrated in FIG. 3. All of the logic timing is derived from a master clock 142 which, in one embodiment of the controller logic, comprises a 320 KHz clock. Accordingly, clock L 142 outputs a series of 3.125 $\mu$second pulses, as indicated in FIG. 4A. The 3.125 $\mu$second pulses clock octal counter 144 to generate a series of 40 KHz pulses of 3.125 $\mu$second duration. The $Q_0$, $Q_2$, $Q_5$ and $Q_7$ outputs from octal counter 144 are latched by a D flip-flop 146 in response to clocking pulses supplied by master clock 142 via inverter 148. The various Q and $\overline{Q}$ outputs of flip-flop 146 provide a series of timing pulses $Q_1$, $Q_2$, $Q_3$, $Q_4$, as well as the aforementioned timing pulses $\overline{Q_1}$ and $\overline{Q_3}$. The carryout from octal counter 144 functions as a 40 KHz clock for octal counter 150 and is also directed to the heating current supply of FIG. 6B. The use of flip-flop 146 ensures minimum overlap as well as precise timing. The $Q_0$ output of octal counter 150 defines a 200 $\mu$second period which constitutes the basic operating cycle of the controller. During all but the first 25 $\mu$seconds of each 200 $\mu$second period, this $Q_0$ output resets flip-flop 146. Hence, it can be seen that the $Q_1$, $Q_2$, $Q_3$, and $Q_4$ timing pulses from flip-flop 146 occur only once in each controller operating cycle. The $Q_1$, $Q_2$, $Q_3$ and $Q_4$ timing pulses, as well as the reset pulse supplied by the $Q_0$ output of octal counter 150, are illustrated in FIGS. 4B through 4F respectively.

Figure 4G:
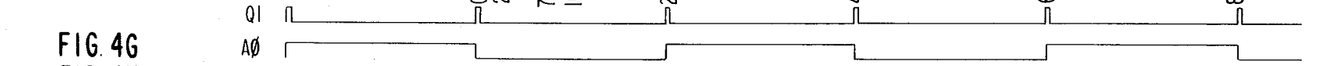
Figure 4H:
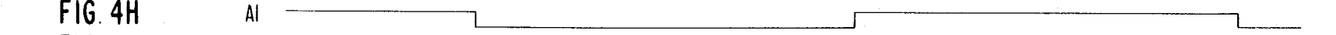

The $Q_7$ output from octal counter 150 clocks binary counter 152 to provide address bits $A_0$ and $A_1$. More particularly, binary counter 152 may comprise a 12-bit binary ripple counter wherein the $Q_1$ and $Q_2$ outputs are connected to supply the address bits. Thus, the values of $A_0$ and $A_1$ will continuously shift between 00, 01, 10 and 11, with each such shift occurring at the outset of each 200 μsecond operating cycle as indicated in FIGS. 4G and 4H. The $Q_{12}$ counter output, i.e., the output from the twelfth binary stage of binary counter 152, provides a 1.2 Hz clock signal for use by the remaining portion of the controller logic.

As previously indicated, the controller of the present invention is essentially a state machine, with the first several states characterizing the controller calibrating mode and the final state characterizing the controller heating mode. Successive $Q_1$ timing pulses from flip-flop 146 clock an octal counter 154 through a series of internal levels which define the controller states. The $Q_0$ output of counter 154 in particular defines the $ST_0$ or Resistance Limit Check state, while the $Q_1$ output of counter 154 defines the $ST_1$ or Slope Measurement state, the $Q_2$-$Q_5$ outputs of the counter define the $ST_2$, $ST_3$, $ST_4$ and $ST_5$ or Calibration states and the $Q_6$ output of the counter defines the $ST_6$ or Heat state. During the Resistance Limit Check state, the measured resistance signal $R_m$ leaving multiplexer 56 in FIG. 2 is supplied to a limit check circuit 156 including a pair of limit comparators 158 and 160. Comparator 158 is adjusted to compare the measured resistance signal with a predetermined lower limit, while comparator 160 is adjusted to compare the measured resistance signal with a predetermined upper limit. The output of comparator 158, which switches high when the measured resistance drops below the predetermined lower limit, is inverted by logic device 162 to provide one input to NOR gate 164. Where the controller of the present invention is employed interchangeably with two- and three-segment resistive heating elements, logic device 162 may comprise a NOR gate enabled by the $A_1$ address bit; in this manner, measured resistance readings for addresses 10 and 11, which addresses respectively represent a shorted resistive heating segment and a fictitious heating segment in the two-segment heating element embodiment, will not produce erroneous low-limit readings because the $A_1$ address bit will switch high to disable logic device 162. The remaining input to NOR gate 164 is supplied by the output of comparator 160. Comparator 160 switches high whenever the measured resistance exceeds the predetermined high limit. As a net result, the output signal RLIM of NOR gate 164 is high as long as the measured resistance falls somewhere between a predetermined high and low limit.

The RLIM signal from NOR gate 164 passes to NOR gate 166 and is enabled by a $\overline{Q_3}$ pulse from counter 146. That is, 15.6 μseconds into the resistance measurement interval of each operating cycle, the $\overline{Q_3}$ signal drops low and the output of NOR gate 166 is determined by the output of NOR gate 164. As long as the measured resistance is within the aforementioned upper and lower limits, RLIM is high and the output of NOR gate 166 remains low to remove the reset and set conditions respectively from four-bit binary counter 168 and D flip-flop 170. Counter 168 is subsequently clocked by successive $Q_1$ pulses from counter 146 until reaching the eighth such pulse, whereupon the $Q_4$ output of counter 168 switches high to clock flip-flop 170 and generate a high $\overline{Q}$ flip-flop output. This high $\overline{Q}$ output is driven low by NAND gate 172, releasing the reset from counter 154 and permitting the counter to shift internal levels in response to the next $Q_1$ clock pulse received from counter 146. RLIM, of course, must remain high throughout the period marked by the eight $Q_1$ pulses from counter 146 if counter 154 is to advance to the $ST_1$ or Slope Measurement state, inasmuch as the occurance of any low RLIM signal indicative of a resistance out-of-limit condition will produce a high output from NOR gate 166. The high output from NOR gate 166 in turn resets counter 168 and sets flip-flop 170 to provide a low $\overline{Q}$ input to NAND gate 172. The consequent high output from NAND gate 172 locks counter 154 into a reset condition, and the counter cannot advance past the $ST_0$ state. It is also noted that a power-on pulse PO, which is briefly generated by inverter 173 as power to the controller is turned on, resets both flip-flop 170 and counter 154 via NAND gate 172. The duration of the PO pulse is determined by the amount of time necessary to charge capacitor 175.

After the counter 154 moves into the Slope Measurement or $ST_1$ state, the slope of the resistance measurements as a function of time is ascertained using slope detection circuit 174. A resistance measurement from a given resistive heating segment 20, 22 or 24 is selected by physically positioning a jumper 176 connected between multiplexer 56 and sample-and-hold circuit 178. The resistance measurement so sampled is clocked from sample-and-hold circuit 178 by the $Q_3$ pulse from counter 146 and passes through amplifier 180 to a second sample-and-hold circuit 182. Sample-and-hold circuit 182 is clocked by the 1.2 Hz pulse from the $Q_{12}$ output of binary counter 152 to supply the positive input of an instrumentation amplifier 184. Instrumentation amplifier 184 operates to compare the measured resistance from sample-and-hold circuit 182 with the next succeeding measured resistance from amplifier 180. The instrumentation amplifier output is supplied to three comparators 186, 188 and 190 for respective comparison against reference voltages representing resistance slopes of $-0.02$ Ω per second, $-0.001$ Ω per second and $+0.004$ Ω per second. The outputs of comparators 188 and 190 are combined in NOR gate 192 to furnish a single signal SLLO indicative of a resistance slope sufficiently low to permit calibration to proceed. That is, whenever the slope of the resistance measurement is greater than $-0.001$ Ω per second but less than $+0.004$ Ω per second, the resistive heating segments are assumed to be at ambient temperature and the outputs of comparators 188 and 190 both switch low to drive the SLLO output of NOR gate 192 high. The output of comparator 186 furnishes a signal SLHI which switches high to indicate a high resistance slope in the negative direction, i.e., to indicate a resistive heating element that is cooling rapidly. An assumption is made that a rapidly cooling heating element has been recently heated, such as occurs where the heating element has previously been calibrated and used for heating, but has for some reason been momentarily disconnected from the controller. Under these circumstances, the controller can utilize the existing values for $R_{amb}$ to perform the comparisons between $R_m$ and $R_{hot}$ once the heating element is re-connected, and the high value of SLHI is employed to apprise the controller logic of this fact.

The SLLO signal from NOR gate 192 and the SLHI signal from comparator 186 are input to NOR gate 194. If either signal is high, the output of NOR gate 194 switches low to provide a high output from NAND gate 196. The high output from NAND gate 196 drives NAND gate 198 low in the presence of a high $S_1$ (i.e., $Q_1$) signal from counter 154, whereupon the reset of octal counter 200 is released. A high SLLO signal will enable NAND gate 202 to pass 1.2 Hz pulses from binary counter 152 through inverter 204 to the clock input of flip-flop 206. The $\overline{Q}$ output from flip-flop 206 remains low as long as the PO signal supplied to the flip-flop reset remains low, enabling NOR gate 208 to pass 1.2 Hz clock pulses directly from binary counter 152 to octal counter 200. When the fourth 1.2 Hz clock pulse reaches counter 200, the $Q_4$ output thereof switches high to drive NAND gate 210 low, producing a high output from NAND gate 212. Because the controller is in the $ST_1$ or Slope Measurement state, the $S_1$ output from counter 154 is high and, in combination with the high output from NAND gate 212, forces the output of NAND gate 214 low to remove the clock inhibit signal from counter 154. Counter 154 is thus free to advance from the $ST_1$ state to the $ST_2$ or first calibration state in response to the next timing pulse received at the clock input to counter 154 from the $Q_1$ output of counter 146.

If the SLLO signal is low, indicating that the resistive heating segments 20–24 are not at ambient temperature, NAND gate 202 is locked into a high output and flip-flop 206 cannot be clocked. The $\overline{Q}$ output of flip-flop 206 will nevertheless remain low to enable 1.2 Hz clock pulses passing through NOR gate 208 to counter 200 unless power to the controller has been interrupted. Where such an interruption has occurred, the PO signal will pulse positive after power is restored, resetting flip-flop 206 and switching the $\overline{Q}$ output thereof high. NOR gate 208 is then disabled to prevent clock pulses from reaching counter 200, and counter 154 cannot advance from state $ST_1$ to state $ST_2$ until the resistance of the resistive heating segments 20–24 has returned to ambient levels, i.e., until SLLO is again high. This precaution is taken because the contents of random access memories 62 and 64 in FIG. 2 may be altered by the power off/power on sequence. Requiring the SLLO signal to switch back to its high level before removing the clock inhibit from counter 154 will result in recalibration of the ambient resistance $R_{amb}$ for each resistive heating segment, thereby preventing any altered random access memory reading from affecting the accuracy of controller operation. Note that SLLO must return to a high level following a power-off condition, even though the SLHI signal is high and the reset is removed from counter 200 after power is initially restored to the controller. This feature insures that a power-off condition necessitating recalibration will not be confused with the recent heating condition which may accompany a momentary disconnection between the resistive heating segments and the controller, the latter condition not necessitating recalibration.

Figure 4I:
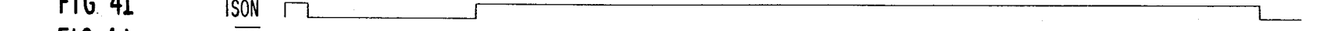

When counter 154 advances from the $ST_1$ state to the $ST_2$ state, the $S_1$ output of counter 154 drops to a low value, disabling NAND gate 212 and locking the output of NAND gate 214 low. Counter 154 can no longer be inhibited by changes in the SLLO or SLHI signals which may otherwise occur as the sensing current $I_s$ flows through the resistive heating elements during measurement of $R_{amb}$. The $S_2$ (i.e., $Q_2$) output of counter 154 switches high as the counter shifts into state $ST_2$, setting flip-flop 216 to force the Q output thereof high while forcing the $\overline{Q}$ output thereof low. This low $\overline{Q}$ output drives NAND gates 218 and 220 high, respectively generating the ISON and $\overline{INS}$ signals indicated in FIGS. 4I and 4J. The ISON signal is supplied to the sensing current generator 28, where it initiates the flow of sensing current $I_s$ as will be described in connection with FIG. 6A. It will be recalled that a high ISON also switches the $\overline{FET}_1$, $\overline{FET}_2$ and $\overline{FET}_3$ signals of control circuit 80 in FIG. 2 high to deactivate power transistors 100–104 and permit the sensing current to flow through resistive heating segments 20–24. The $\overline{INS}$ signal operates digital switches 36–42 of FIG. 2. With the sensing current flowing and digital switches 36–42 opened, valid resistance measurements are available at the outputs of each instrumentation amplifier 30–34. The $\overline{INS}$ signal is graphically illustrated in FIG. 4J.

Figures 4K, 4L, 4M:
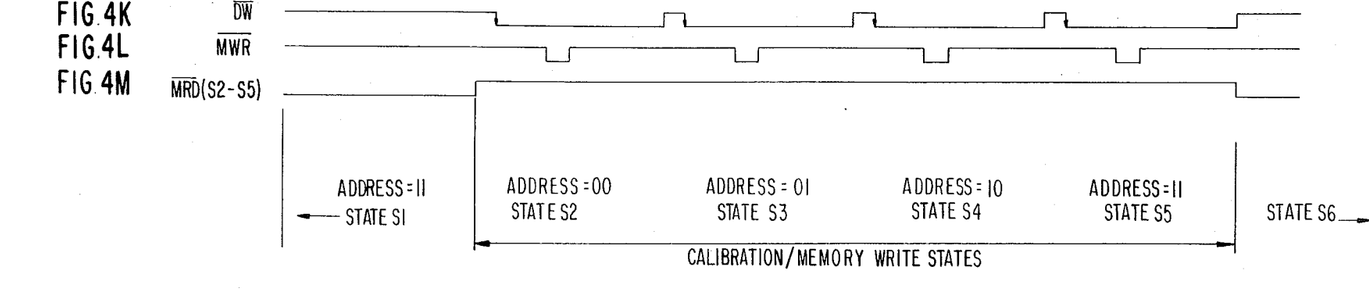

The high Q output from flip-flop 216 supplies a high $\overline{MRD}$ signal to random access memories 62 and 64, placing the random access memories in a not-read condition. The high Q output from flip-flop 216 also enables NAND gates 222 and 224 in respective preparation for the $\overline{DW}$ and $\overline{MWR}$ pulses. The $Q_4$ output of a quad SR flip-flop 226 is connected to the remaining input of NAND gate 222. The set and reset pins governing the $Q_4$ output of flip-flop 226 are respectively supplied with the $Q_4$ and $Q_1$ outputs from counter 146. Accordingly, at the start of the controller operating cycle which coincides with calibration state $ST_2$, the $Q_4$ output from flip-flop 226 is reset to a low value and the $\overline{DW}$ pulse from NAND gate 222 shifts high. 22 $\mu$seconds later, the $Q_4$ output from flip-flop 226 is set to a high value and $\overline{DW}$ switches low. The falling edge of the $\overline{DW}$ signal, shown in FIG. 4K causes A-to-D converter 58 to digitize the value of the measured resistance present at its input. This value, as will be recalled, represents the ambient resistance $R_{amb}$ of the resistive heating segment currently being addressed. Upon reflection, it can be seen that no correlation exists between the controller state and the heating segment address. That is, resistive heating segment 20 will always be identified by address bits 00 in random access memories 62 and 64, but the value of $R_{amb}$ for resistive heating segment 20 may not be measured during calibration state $ST_2$ Since there are four calibration states ($ST_1$, $ST_2$, $ST_3$, and $ST_4$), however, the ambient resistance of each heating segment will ultimately be measured and the value of $R_{amb}$ so obtained stored in the proper memory address as the address bits continue to circulate.

The remaining input to NAND gate 224 is supplied by the output of AND gate 228. AND gate 228 is enabled by the $\overline{Q}$ output of flip-flop 230 and is clocked by a 5 KHz signal from the $Q_3$ output of counter 150. Flip-flop 230, which itself is clocked by the 1.2 Hz signal leaving inverter 204, receives a data input from the SLHI output of comparator 186. A low SLHI, such as occurs when resistive heating segments 20–24 are at ambient temperature, forces the $\overline{Q}$ output of flip-flop 230 high. The 5 KHz signal from counter 150 arrives at AND gate 228 75 $\mu$seconds after the initiation of each controller operating cycle, i.e., after three carry out pulses are generated in counter 144, switching the output of AND gate 228 high to drive NAND gate 224 low. The attendant falling edge in the $\overline{MWR}$ pulse from NAND gate 224, illustrated in FIG. 4L, causes the digitized value of the ambient resistance at A-to-D converter 58 to be written into random access memories 62 and 64. If, in contrast, SLHI is high and no PO signal has reset flip-flop 206, a situation which arises when the resistive heating segments have for one reason or another been momentarily disconnected from the controller while being heated, counter 154 will have reached the $ST_2$ state following the passage of four 1.2 Hz pulses through NOR gate 208 to the clock input of counter 200. The $\overline{Q}$ output of flip-flop 230 will then switch low to disable AND gate 228, preventing the $\overline{MWR}$ pulse from falling. In this manner, no new value of $R_{amb}$ will be written into random access memories 62 and 64 as the controller proceeds through state $S_2$, and recalibration of resistive heating segments 20–24 will be avoided.

200 μseconds following the start of state $ST_2$, the next $Q_1$ pulse from counter 146 clocks counter 154 ahead to calibration state $ST_3$. The same sequences of $\overline{DW}$ and $\overline{MWR}$ pulses described in connection with calibration state $ST_2$ serve to store the value of the ambient resistance for one of the remaining resistive heating segments during state $ST_3$. Similarly, the value of $R_{amb}$ for the final resistive heating segments are stored during calibration states $ST_4$ and $ST_5$. The address bits $A_0$, $A_1$ change every 200 μseconds such that the value of $R_{amb}$ associated with just one resistive heating segment is stored for each calibration state. Of course, in the three-segment embodiment of the resistive heating element 2 disclosed in FIG. 2, one of the calibration states will measure the resistance of a fictitious heating element and a corresponding zero value will be stored at address 11.

Upon completion of calibration state $ST_5$, counter 154 will advance to state $ST_6$. The corresponding low $\overline{S}_6$ signal generated by inverter 232 at the $S_6$ (i.e., $Q_6$) output of counter 154 locks the output of NAND gate 214 high to inhibit further clocking of the counter. The controller will now remain in the $ST_6$ or Heat state unless some chamge in circumstances causes the resistance of the resistive heating elements 20–24 to exceed the predetermined limits established in limit check circuit 156. Such a change would produce a low RLIM signal, permitting NOR gate 166 to periodically switch high and reset counter 154. Barring a low RLIM signal, flip-flop 216, which was set by the $S_2$ output of counter 154 at the beginning of calibration state $ST_2$ will now be clocked by the $S_6$ output of counter 154. Because the $S_2$ output of counter 154 is now low, the set is removed from flip-flop 216 and the Q output thereof switches low while the $\overline{Q}$ output thereof switches high. The $\overline{MRD}$ signal is accordingly locked into a low value to place random access memories 62 and 64 in a constant read status. NAND gates 222 and 228 are simultaneously driven high to prevent further digitizing and memory write operations by A-to-D converter 58 and the random access memories. The high $\overline{Q}$ output from flip-flop 216 enables NAND gates 218 and 220 to receive the $Q_1$ and $Q_2$ outputs of quad flip-flop 226. The $Q_1$ output of flip-flop 226, which is set by the $Q_1$ output of counter 150 and reset by the $Q_1$ output of counter 146, switches ISON high for a 25 μsecond interval at the beginning of each controller operating cycle to define the resistance measuring period of the cycle. The $Q_2$ output of flip-flop 226, which is set by the $Q_4$ and reset by the $Q_2$ outputs of counter 146, switches $\overline{INS}$ high 6.25 μseconds into each controller operating cycle to open digital switches 36–42, whereupon the voltage drops across resistive heating segments 20–24 are applied to instrumentation amplifiers 30–34 for the purpose of performing the actual resistance measurements.

Both ISON and $\overline{INS}$ return to a low value at the end of the 25 μsecond measuring period. The remaining 175 μseconds in each operating cycle define the heating period of the cycle, and are devoted to the regulation of heating current flow through the resistive heating segments in response to the $\overline{FET}_1$, $\overline{FET}_2$ and $\overline{FET}_3$ control signals generated in control circuit 80.

Figure 5A:
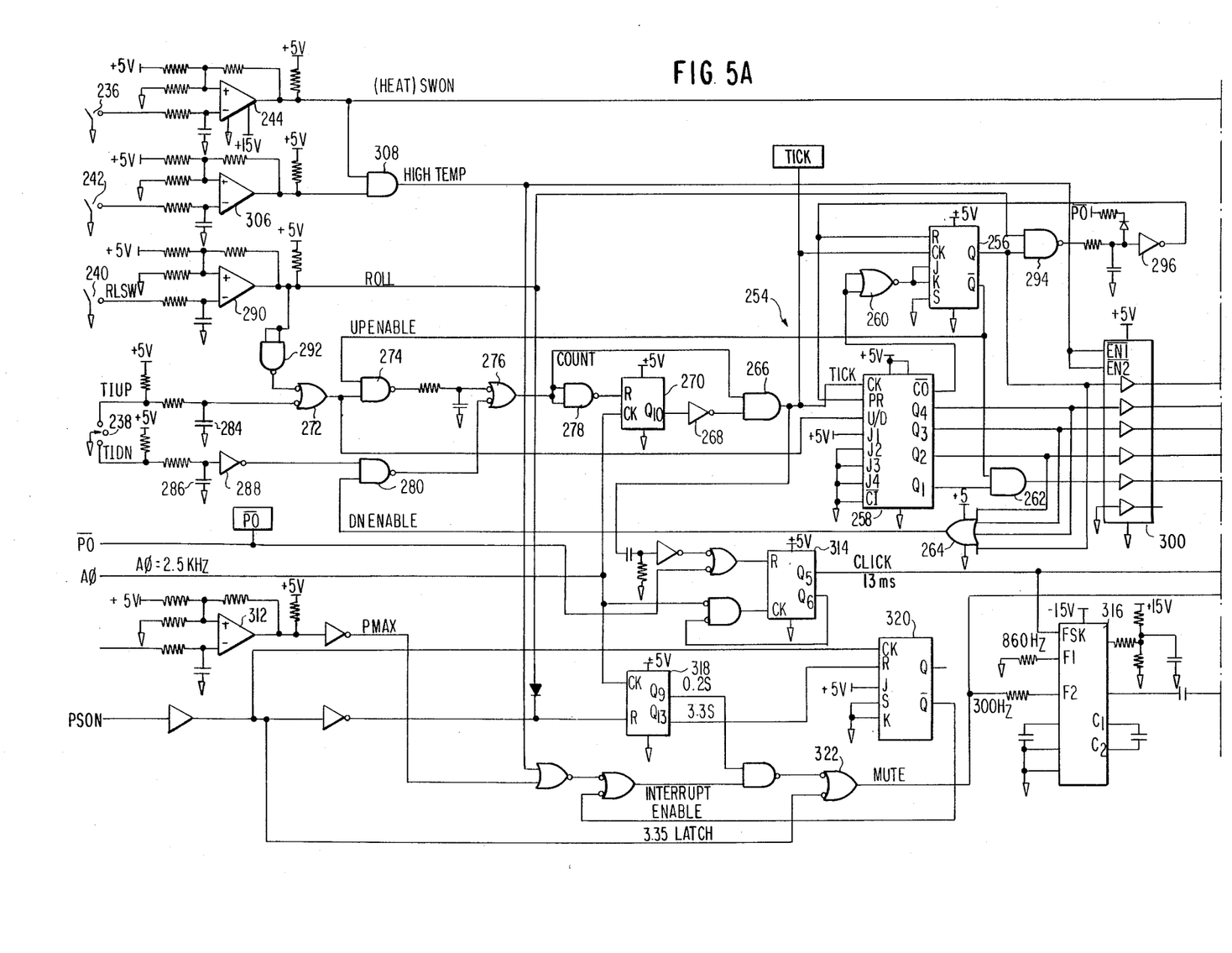
FIGS. 5A and 5B are circuit diagrams which illustrate the parameter input/output board employed in conjunction with the controller of FIG. 2.
Figure 5B:
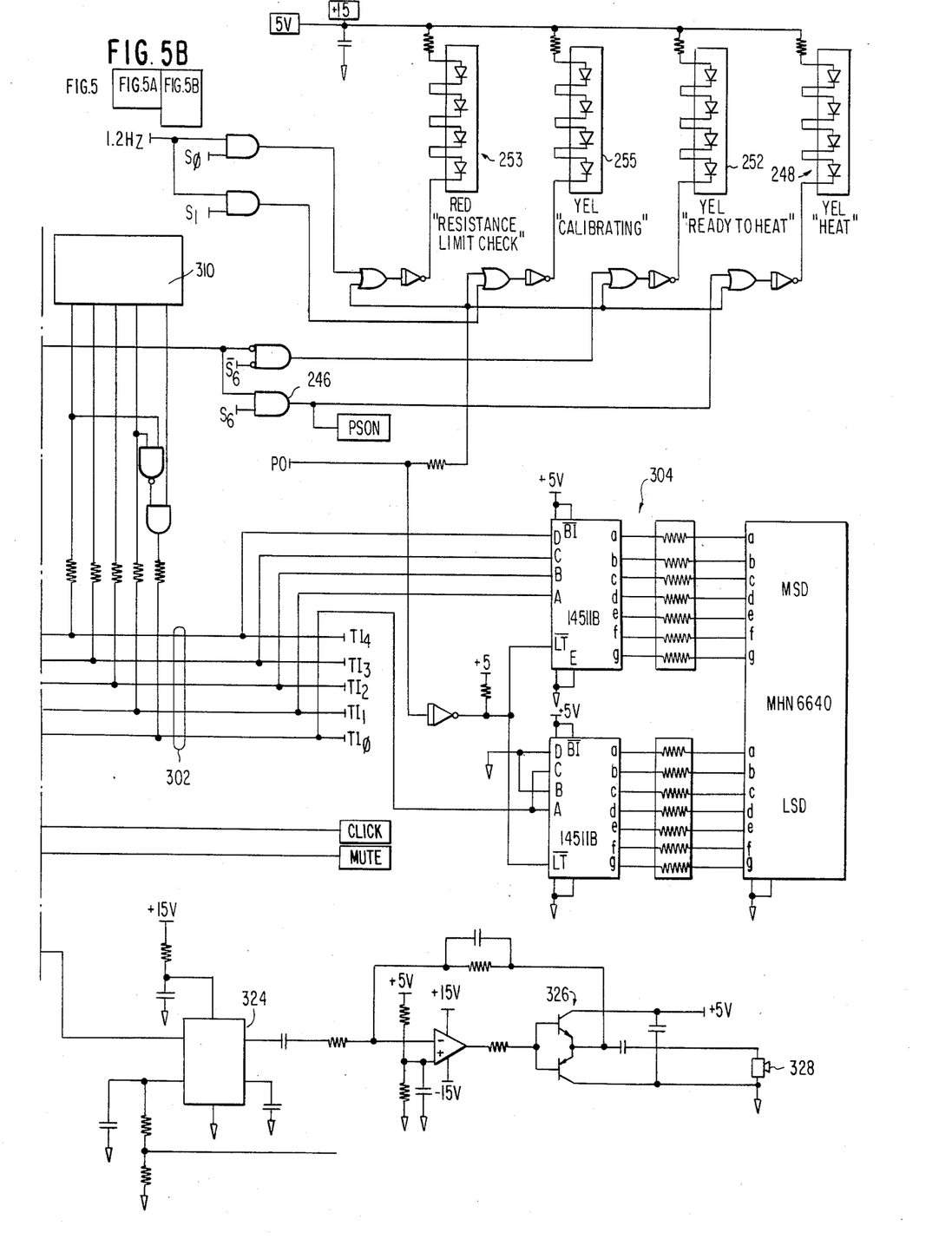

An input/output board, shown in detail in FIG. 5, processes inputs from the controller operator in order to determine whether the resistive heating segments 20–24 should be energized with heating current and, if so, what the desired temperature setting should be. The input/output board also generates an audible signal to inform the operator of controller status. A heat switch 236 is used to indicate a demand for heat from resistive heating segments 20–24, while an up/down switch 238, a roll switch 240 and a high temperature switch 242 are used to set the temperature index TI. Heat switch 236 in particular is connected to amplifier 244. After the controller has reached the $ST_6$ or heat state, as described more fully with regard to FIGS. 3 and 4, the controller operator may signal a demand for heat by closing switch 236. Amplifier 244 subsequently provides a SWON signal which is gated at 246 by the $Q_6$ output of counter 154, generating a PSON signal which is used to initiate operation of heating current supply 26. The PSON output from AND gate 246 also resets D flip-flop 84 in control circuit 80 and activates an LED display 248 to furnish a visual indication of the heat state condition. NOR gate 250, which is otherwise enabled by the $\overline{Q}_6$ output of counter 154 when the controller is in state $ST_6$ shifts low in the presence of the SWON signal to deactivate LED display 252.

Up/down switch 238 and roll switch 240 are connected through an appropriate logic circuit to drive a TI counter 254, thereby establishing a means for setting the temperature index TI to a value representing the desired temperature T of the resistive heating segments 20–24. The temperature index, as previously indicated, is related to the desired temperature in accordance with Equation (3). TI counter 254 may comprise a JK flip-flop 256 in combination with a presettable binary/decade up/down counter 258 such as a National Semiconductor CD4029. Where the JK flip-flop and up/down counter combination is employed, the carry out signal from up/down counter provides both the J and K inputs of flip-flop 256 through NAND gate 260. The temperature index TI is then stored in TI counter 254 as a five bit binary word, with the Q output of flip-flip 256 serving as the Least Significant Bit representative of the temperature index ones digit (either a zero or a five) and the $Q_1$, $Q_2$, $Q_3$ and $Q_4$ outputs of the up/down counter 258 serving as the remaining four bits representative of the temperature index tens digit (zero to eight). The $\overline{Q}$ output from flip-flop 256 gates the $Q_1$ output of up/down counter 258 via AND gate 262 while providing an UP ENABLE signal. The Q output of flip-flop 256, along with the $Q_2$, $Q_3$ and $Q_4$ outputs of up/down counter 258, provides a DOWN ENABLE signal from quad-input OR gate 264.

TI counter 254 is clocked by a 2.44 Hz signal supplied via AND gate 266 and inverter 268 from the $Q_{10}$ output of binary counter 270. Binary counter 270 is in turn clocked by the 2.5 KHz address bit $A_0$ from binary counter 152 in FIG. 3. When up/down switch 238 and roll switch 240 are in the open position, NAND gates 272, 274, 276, 278, 280 and 282 function to reset counter 270, thus preventing any clock pulses from reaching TI counter 254. When, however, either the up/down switch or the roll switch is closed to initiate a TI count, the reset is removed from counter 270 as follows. Movement of the up/down switch 238 to the UP position discharges capacitor 284 to ground, providing a low input to NAND gate 272 and driving the output thereof high. The high output from NAND gate 272 sets the up/down pin of up/down counter 258 in the count-up mode and, assuming that the UP ENABLE signal from flip-flop 256 is high, simultaneously drives the output of NAND gate 274 low. NAND gate 276 subsequently supplies a high output to NAND gate 278, removing the reset from binary counter 270 to initiate the 2.44 Hz pulses from the counter $Q_{10}$ output. The 2.44 Hz pulses pass through inverter 268 and AND gate 266 to clock the flip-flop 256 and up/down counter 258. In an analogous manner, the closure of up/down switch 238 in the DOWN position discharges capacitor 286 to ground, providing a high output from inverter 288 and switching NAND gate 280 low in response to a high DOWN ENABLE signal from quad-input OR gate 264. The low output from NAND gate 280 drives the output of NAND gate 276 high to remove the reset from binary counter as described above. Clock pulses reaching the TI counter 254 with the up/down switch 238 in the down position, however, will cause TI counter to count down, inasmuch as the output from NAND gate 272 is now low to set up/down counter 258 in the count-down mode.

Roll switch 240 is used to advance TI counter 254 in the up direction. When the roll switch is grounded, amplifier 290 produces a high signal which drives the output of NAND gate 292 low, whereupon NAND gate 272 switches high to initiate the count-up operation of TI counter 254. The high output from amplifier 290 also enables NAND gate 294 connected to the Q output of flip-flop 256. As TI counter 254 reaches a count of 80, indicating a temperature setting of 260 degrees, the carry out of up/down counter 258 switches low to drive the J and K inputs to flip-flop 256 high, whereupon the Q output of the flip-flop switches high to drive the output of NAND gate 294 low. Inverter 296 subsequently supplies a PRESET pulse to both flip-flop 256 and up/down counter 258, resetting the TI counter 254 back to its initial value of 05. Continued grounding of the roll switch 240 causes the TI counter 254 to count up until a TI value of 80 is again reached and the TI counter reset once more.

A tri-state buffer 300 connected to TI counter 254 performs a BCD conversion of the TI counter output, supplying leads 302 with a digital representation of the selected temperature index $TI_0$, $TI_1$, $TI_2$, $TI_3$ and $TI_4$ of the selected temperature index. This digital representation is furnished to digital-to-analog converter 68 in FIG. 2, and may also be supplied to a display means 304 to generate a visual display of the selected temperature index.

Rather than proceed through the count-up or count-down process with TI counter 254, a preset maximum temperature value for the temperature index may be obtained by grounding high temperature switch 242. The output of amplifier 306 switches high as the high temperature switch is grounded, causing AND gate 308 to output a high signal as long as the heat switch 238 is also grounded. The high output from AND gate 308 shifts the TI setting from TI counter 254 to a maximum temperature index setting pre-programmed into digital switch 310 by disabling tri-state buffer 300. With the tristate buffer disabled, the $TI_0$–$TI_4$ outputs on leads 302 follow the value of the temperature index set into digital switch 310. If high temperature switch 242 is not grounded, the outputs from amplifier 306 and AND gate 308 are low to enable the tri-state buffer 300, and the values for $TI_0$–$TI_4$ reflect the outputs from TI counter 254.

The audio section of the input/output board of FIG. 5 includes a 90% power detector 312 which filters the carry out signal from counter 146 in FIG. 3 and compares it with 0.90Vee. The output from power detector 312 is active high when the power requirement exceeds 90% of full power and enables an intermittent tone. A click counter 314 is reset by the power-on signal ($\overline{PO}$) or by the 2.44 Hz clock pulses from counter 266. The $Q_5$ output from counter 314 forms a 13 ms pulse delayed by 13 ms. The clock of counter 314 is disabled by the $Q_6$ output thereof so that each reset results in one CLICK pulse. The CLICK pulse switches function generator 316 to frequency $F_2$, which frequency in the preferred embodiment is 860 Hz. Repeated CLICK pulses generate a clicking sound comprised of 860 Hz tone bursts. The intermittent tone counter 318 has two outputs, 4.88 Hz and 0.3 Hz. When the SWON signal drives AND gate 256 high to activate the resistive heating elements, counter 318 is allowed to count and the 3.3 sec latch 320 is set. This causes a MUTE signal from NAND gate 322 to oscillate at 4.88 Hz, producing an intermittent tone at 300 Hz. After 3.3 seconds, latch 320 is reset and the tone becomes constant. A high output from AND gate 246 enables the intermittent tone regardless of the state of the 3.3 sec latch. The triangle wave output of the function generator 316 is used. The frequency of function generator 316 can be switched between $f_1$ and $f_2$ as determined by the current flowing out of pins 7 and 8, respectively. These pins are biased at about +3 V so that when MUTE is high, no current flows out of pin 8 and the function generator is effectively turned off. Volume control is obtained by the use of voltage attenuator 324. The gain is determined by the DC voltage or resistance at pin 2. The attenuation increases with increasing resistance, so the volume can be decreased to zero merely by making the resistance infinite. The output stage of attenuator 324 has a fixed gain of 0.56; the output from the Darlington transistors 326 is AC coupled to the speaker 328 with a maximum amplitude of about 2.5 V peak-to-peak. The power supply leads to the Darlington transistors are separate from the rest of the circuitry to minimize their effect due to the relatively large currents.

Figure 6A:
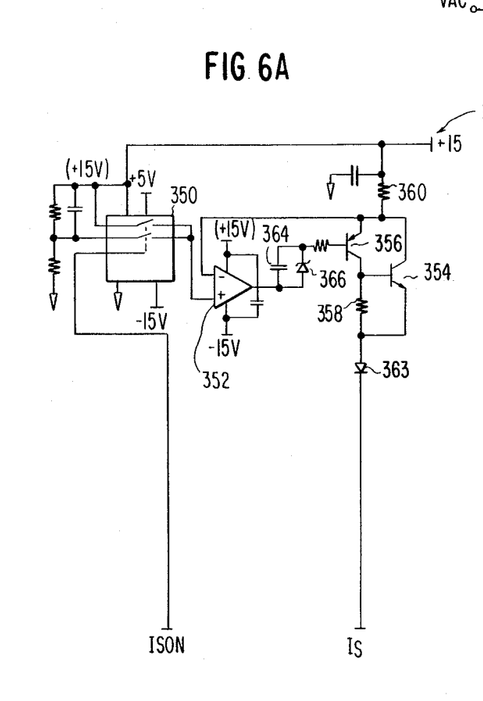
FIGS. 6A and 6B are circuit diagrams respectively illustrating the sensing current generator and heating current supply.
Figure 6B:
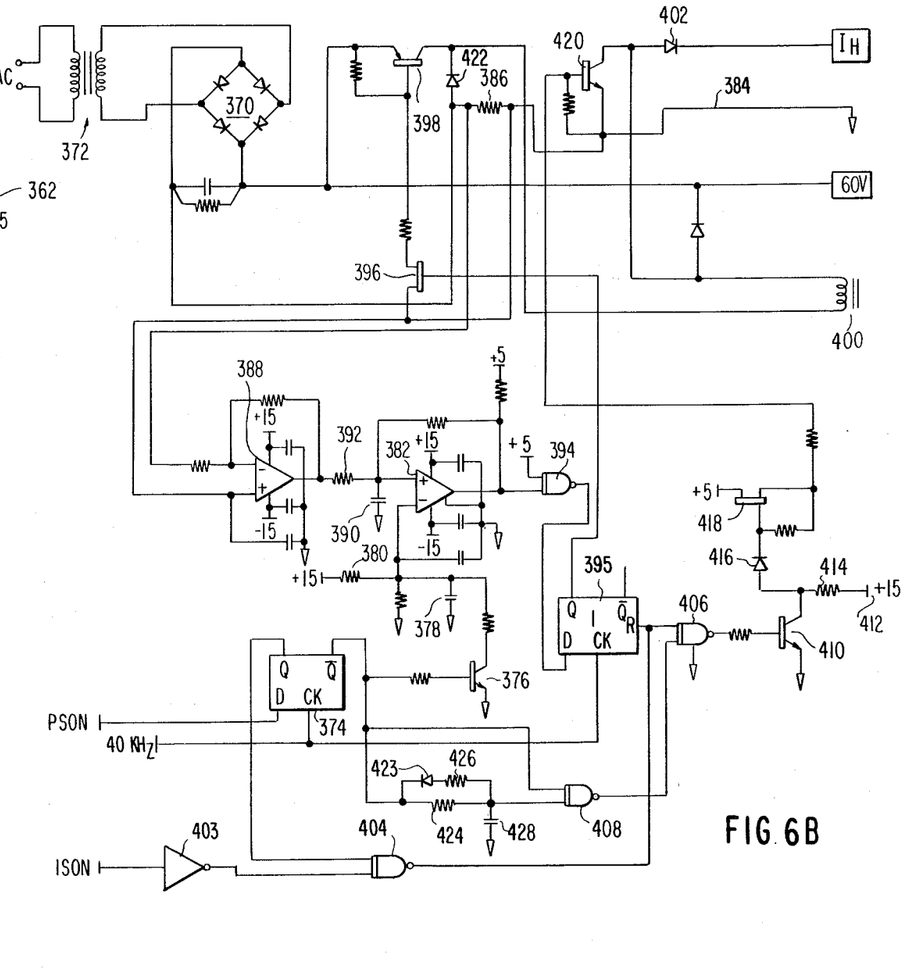

FIGS. 6A and 6B respectively illustrate the sensing current generator 28 and the heating current supply 26 in detail. The sensing current generator 28 provides a sensing current $I_s$ having a magnitude of 200 mA. When a demand for sensing current is signaled by a high ISON signal from the controller logic, digital switch 350 closes to supply 10 volts to the positive input of operational amplifier 352. Transistors 354 and 356, along with resistor 358, are connected in feedback configuration between the output of operational amplifier 352 and the operational amplifier negative input. Transistors 354 and 356 and resistor 358 comprise a composite PNP transistor which, when turned on by a high output from operational amplifier 352, draw current through resistor 360 from 15 volt source 362 until a steady state or stabilized feedback condition exists, i.e., until the voltage drops at the positive and negative inputs to operational amplifier 352 equal one another. Thus, when stabilized feedback conditions exist, voltage at the negative operational amplifier input will equal +10 volts, and the current flow through resistor 360 will adjust to (15 V−10 V)/24.9Ω or 0.200 amps. The 0.200 amp current constitutes the sensing current $I_s$, and is drawn out from sensing current generator 28 through blocking diode 363 to the resistive heating segments 20, 22 and 24. Capacitor 364 and diode 366 establish an operating point of approximately +5 V at the operational amplifier output.

The heating current supply 26 of FIG. 6B operates to generate a 2.5 amp heating current using a 60 volt DC unregulated power derived from a full wave rectifier 370 connected across the secondary of transformer 372. The primary transformer 372 is supplied with 120 volt AC unregulated line power. When a demand for heat from resistive heating segments 20, 22 and 24 is signaled, a high PSON signal is generated by the input/output board to load the D input of flip-flop 374. The D input is clocked through flip-flop 374 by a 40 KHz signal supplied from counter 144 of FIG. 3, causing the $\bar{Q}$ output of the flip-flop to switch low and turn off transistor 376. With transistor 376 off, capacitor 378 charges through resistor 380 to an appropriately selected reference voltage. This reference voltage, which may through suitable adjustment of the resistive values be set to +2.5 volts, supplies the negative input of comparator 382. The value of current flowing through the common lead 384 from resistive heating segments 20–24 is sensed across resistor 386 and amplified by amplifier 388 to provide the positive input for comparator 382. Proper scaling between the reference voltage and measured current inputs to comparator 382 may be obtained by setting the value of resistor 386 to 0.1Ω and adjusting the gain of amplifier 388 to −10, whereupon the amplifier will output 1 volt per amp of measured current. Capacitor 390 and resistor 392 form an RC filter for the amplifier output. If the sensed current through resistor 386 is less than 2.5 amp, the output of comparator 382 will switch low to drive the output of NAND gate 394 high. The high output from NAND gate 394 provides the D input to flip-flop 395, which D input is clocked through the flip-flop by the aforementioned 40 KHz pulses from controller logic. The high Q output from flip-flop 395 resulting from the high D input turns transistor 396 on to activate a pass transistor 398. Pass transistor 398 in turn causes current to flow through inductor 400 and diode 402 into the resistive heating segments 20–24, whereupon the resistive heating elements dissipate power to generate heat. If, however, the current flow through resistor 386 is greater than 2.5 amp, output from comparator 382 will be high to disable NAND gate 394 and the Q output from flip-flop 393 will switch low to turn off transistor 396 and 398. At this point, transformer 372 and full wave rectifier 370 are isolated from the resistive heating segments 20–24, but the presence of inductor 400 will maintain a substantially constant flow of current through the resistive heating elements until the level of current flow drops below 2.5 amps and comparator 382 once again outputs a low signal to turn on pass transistor 398.

During the resistance measuring interval in each controller operating cycle, the 200 mA sensing current $I_s$ from sensing current generator 28 is passed through resistive heating segments 20–24 as previously described and the 2.5 amp heating current from heating current supply 26 must be isolated from the resistive heating elements. This isolation is accomplished by generating a high ISON signal in the controller logic to indicate the occurrence of the resistance measuring interval. The high ISON signal drives inverter 403 to switch the output of NAND gate 404 high, forcing flip-flop 395 into a re-set condition while supplying one input to NAND gate 406 with a high signal. The re-set condition of flip-flop 395 produces a low flip-flop Q output to turn transistor 396 and pass transistor 398 off. Meanwhile, the low $\bar{Q}$ output from flip-flop 374 produces a high output from NAND gate 408, which high output is supplied to the second input of NAND gate 406. The resulting low output from NAND gate 406 turns off transistor 410, allowing current to flow from voltage source 412 through resistor 414 and diode 416 to the base of transistor 418. Transistor 418 is thus activated to turn shunt transistor 420 on, whereupon the 2.5 amp heating current is diverted from resistive heating elements 20–24 and instead flows from inductor 400 through the shunt transistor to commutating diode 422 and back into the inductor. Thus, it can be seen that the 2.5 amp heating current does not interfere with the 0.200 amp sensing current. When the resistance measuring interval of each controller operating cycle is over, ISON switches low and, together with the high Q output from flip-flop 374, drives the output of NAND gate 404 low to remove the re-set from flip-flop 395 and switch the output of NAND gate 406 high. Transistor 410 is then activated to ground the gate of transistor 418, deactivating transistor 418 and turning off shunt transistor 420. With the shunt transistor off, current flowing through pass transistor 398 once again resumes its normal path from inductor 400 through diode 402 and resistive heating segments 20–24 before returning through sensing resistor 386 to transformer 372. Diode 423, resistors 424 and 426 and capacitor 428 introduce a delay into the falling edge of the high $\bar{Q}$ output from flip-flop 374.

The present invention has been set forth in the form of several preferred embodiments. It is nevertheless understood that modifications to the controller configurations disclosed herein may be made by those skilled in the art without departing from the spirit and scope of the present invention. Moreover, such modifications and variations are considered to be within the purview of the appended claims.

What is claimed is:

1. Apparatus for controlling the flow of heating current through a resistive element in order to heat the resistive element from ambient temperature to a desired temperature, said apparatus comprising:

heating current supply means for supplying the resistive element with heating current;

measuring means for measuring the resistance of the resistive element;

detection means connected to said measuring means for detecting changes in the resistance measured by said measuring means in order to determine when the resistive element is at ambient temperature, said detection means including detection circuit means for generating a first logic signal indicative of ambient temperature conditions in the resistive element;

computing means connected to said measuring means and said detection means for computing the predicted resistance of the resistive element at the desired temperature, said computing means including a first computing circuit means responsive to said first logic signal for receiving the value of said resistance measured by said measuring means when the resistive element is at ambient temperature, said computing means also including a second computing circuit means for computing said predicted resistance as a function of the desired temperature and said value of said resistance received by said first computing circuit means; and comparison means connected to both said measuring means and said computing means for comparing said predicted resistance with said resistance measured by said measuring means, said comparison means including a control signal means for generating a control signal as a function of the difference between said predicted resistance and said resistance measured by said measuring means, said comparison means also including a control circuit means connected to said control signal means for conducting heating current through the resistive element in response to said control signal.

2. Apparatus as set forth in claim 1, further comprising a timing means for generating timing signals which define a succession of operating cycles for said operating apparatus, said measuring means functioning during a first operating cycle and a second operating cycle in said succession of operating cycles to measure the resistance of the resistive element and said detection means functioning during said first operating cycle and said second operating cycle to compare the resistance measured by said measuring means during said first operating cycle with the resistance measured by said measuring means during said second operating cycle.

3. Apparatus as set forth in claim 2, wherein said detection circuit means includes a sample-and-hold means for holding a value representing said resistance measured by said measuring means during said first operating cycle, said detection circuit means also including a a detection comparison means for comparing said value held by said sample-and-hold means with a value representing said resistance measured by said measuring means during said second operating cycle, said detection comparison means functioning to generate said first logic signal when the difference between said value of said resistance measured by said measuring means during said first operating cycle and said value of said resistance measured by said measuring means during said second operating cycle is within a predetermined range.

4. Apparatus as set forth in claim 1, wherein said first computing circuit means includes a memory means for storing said value of said resistance measured by said measuring means when the resistive element is at an ambient temperature.

5. Apparatus as set forth in claim 4, further including a switch means connected to supply said second computing circuit means with a value representing the desired temperature, said second computing circuit means having a means for multiplying said value of said resistance stored by said memory means with a temperature factor derived from said value of the desired temperature.

6. Apparatus as set forth in claim 5, wherein said temperature factor is equal to $(1+\alpha\Delta T)$, where $\alpha$ is a temperature coefficient having a value dependent upon both the ambient temperature and the composition of the resistive element and $\Delta T$ represents the difference between the desired temperature and the ambient temperature.

7. Apparatus as set forth in claim 5, wherein said second computing circuit means includes a first digital-to-analog converter connected to receive from said switch means said value representing the desired temperature, an output amplifier stage connected to said first digital-to-analog converter and adjusted to supply an output representing said temperature factor and a second digital-to-analog converter connected to receive both said value of said resistance stored by said memory means and said output from said output amplifier stage.

8. Apparatus for controlling the flow of heating current through a resistive element in order to heat the resistive element to a desired temperature, said apparatus comprising:

heating current supply means for periodically supplying heating current to the resistive element;

measuring current supply means for periodically supplying measuring current to the resistive element;

logic means connected to said heating current supply means and said measuring current supply means for respectively enabling said heating current supply means and said measuring current supply means to supply the resistive element with heating current and measuring current in alternating fashion;

measuring means for measuring the voltage drop across the resistive element as measuring current flows therethrough and for responsively generating a measured resistance signal indicative of the actual resistance of the resistive element;

computing means for computing the predicted resistance of the resistive element at the desired temperature and for generating a computed resistance signal indicative of said predicted resistance, said computing means including a memory means for storing an ambient resistance value representing the resistance of the resistive element at ambient temperature, said computing means also including a computing circuit means connected to said memory means for generating said computed resistance signal as a function of the desired temperature and said ambient resistance value; and comparison means connected to both said measuring means and said computing means for comparing said computed resistance signal with said measured resistance signal, said comparison means including a control signal means for generating a control signal as a function of the difference between said predicted resistance and said actual resistance of the resistive element, said comparison means also including a control circuit means connected to said control signal means for conducting heating current through the resistive element in response to said control signal.

9. Apparatus for controlling the flow of heating current through a resistive element in order to heat the resistive element to a desired temperature, said apparatus comprising:

timing means for generating timing signals which define operating cycles for said apparatus, each said operating cycle including first and second intervals of predetermined duration;

measuring current supply means connected to receive said timing signals for supplying the resistive element with a measuring current during said first interval of each said operating cycle;

heating current supply means connected to receive said timing signals for supplying the resistive element with heating current during said second interval of each said operating cycle;

measuring means for measuring the voltage drop across the resistive element as measuring current flows therethrough and for responsively generating a measured resistance signal indicative of the actual resistance of the resistive element;

computing means for computing the predicted resistance of the resistive element at the desired temperature and for generating a computed resistance signal indicative of said predicated resistance, said computing means including a memory means for storing an ambient resistance value representing the resistance of the resistive element at ambient temperature, said computing means also including a computing circuit means connected to said memory means for generating said computed resistance signal as a function of the desired temperature and said ambient resistive value; and comparison means connected to both said measuring means and said computing means for comparing said computed resistance signal with said measured resistance signal, said comparison means including a control signal means for generating a control signal as a function of the difference between said predicted resistance and said actual resistance of the resistive element, said comparison means also including a control circuit means connected to said control signal means for conducting heating current through the resistive element during said second interval of each said operating cycle in response to said control signal.

10. Apparatus as set forth in claims 8 or 9, wherein said measuring means includes an amplifier means connected across the resistive element to generate said measured resistance signal in the form of an amplifier output.

11. Apparatus as set forth in claim 10, wherein said amplifier means includes an amplifier having a gain which is adjusted such that the value of said amplifier output equals the value of the actual resistance of the resistive element.

12. Apparatus for controlling the flow of heating current through a resistive element having a plurality of resistive segments in order to heat each of said plurality of resistive segments to a desired temperature, said apparatus comprising:

heating current supply means for supplying the resistive element with heating current;

measuring means for respectively measuring the resistances of each of the plurality of resistive segments;

detection means connected to said measuring means for determining when the resistive segments are at ambient temperature;

computing means for respectively computing the predicted resistances of each of the resistive segments at the desired temperature, said computing means including a first computing circuit means which receives the value of the resistance measured by said measuring means for each resistive segment when each resistive segment is at ambient temperature as determined by said detection means, said computing means also including a second computing circuit means which respectively computes said predicted resistance for each resistive segment as a function of the desired temperature and said value of said resistance of each resistive segment as measured by said measuring means at ambient temperature; and comparison means connected to both said measuring means and said computing means for respectively comparing each of said predicted resistances computed by said computing means with a corresponding one of said resistances measured by said measuring means, said comparison means including a control signal means for generating a plurality of control signals as a function of the respective differences between each of said predicted resistances computed by said computing means and each of said resistances measured by said measuring means, said comparison means also including a control cirucit means connected to said control signal means for selecting individual resistive segments and for conducting heating current through the individual resistive segments so selected in response to said plurality of control signals.

13. Apparatus as set forth in claim 12, wherein said comparison means further includes a multiplexing means connected to said computing means for synchronizing the operation of said comparison means such that said predicted resistances are sequentially supplied to said comparison means and uniquely associated with a corresponding one of said resistances measured by said measuring means.

14. Apparatus as set forth in claim 13, wherein said comparison means includes storage means for respectively storing said predicted resistances supplied from said computing means through said multiplexer means in order to enable simultaneous comparisons between each of said predicted resistances and each of said corresponding resistances measured by said measuring means.

15. Apparatus as set forth in claim 12, further comprising timing means for synchronizing the operation of said measuring means, said detection means and said computing means such that said predicted resistances for the resistive segments are computed in sequential fashion.

* * * * *

UNITED STATES PATENT AND TRADEMARK OFFICE
CERTIFICATE OF CORRECTION

PATENT NO. : 4,549,073

DATED : October 22, 1985

INVENTOR(S) : Paul S. Tamura, Robert J. Strehlow

It is certified that error appears in the above-identified patent and that said Letters Patent is hereby corrected as shown below:

Claim 3, Line 6 (Column 19, Line 37) before "detection" delete "a".

Signed and Sealed this

Ninth Day of August, 1988

Attest:

DONALD J. QUIGG

Attesting Officer      Commissioner of Patents and Trademarks